United States Patent [19]
Weinert

[11] 3,817,617
[45] June 18, 1974

[54] PHOTOGRAPHIC COPYING ARRANGEMENT WITH AUTOMATIC DIAPHRAGM CONTROL

[75] Inventor: Volker Weinert, Munich, Germany

[73] Assignee: AGFA-Gevaert Aktiengesellschaft, Leverkusen, Germany

[22] Filed: Dec. 19, 1972

[21] Appl. No.: 316,556

[30] Foreign Application Priority Data
Dec. 22, 1971 Germany.............................. 2163688

[52] U.S. Cl.................. 355/51, 95/64 D, 352/141, 355/68
[51] Int. Cl. .............................................. G03b 27/76
[58] Field of Search ............. 355/35, 41, 42, 68, 71; 95/64 D; 352/141

[56] References Cited
UNITED STATES PATENTS
2,518,717   8/1950   Rath ................................. 352/141
2,835,165   5/1958   Smith, Jr.......................... 355/71 X
3,483,807   12/1969  Biedermann et al............ 352/141 X
3,698,809   10/1972  Harter et al. ...................... 355/68

Primary Examiner—Samuel S. Matthews
Assistant Examiner—Richard A. Wintercorn
Attorney, Agent, or Firm—Michael S. Striker

[57] ABSTRACT

A first and second diaphragm blade respectively are coupled to a first and second solenoid. The solenoids are intercoupled by gearing in such a manner that the first solenoid rotates in a direction opposite to the second solenoid. One solenoid is activated for closing the diaphragm, one for opening the diaphragm. The signals activating each solenoid are derived from a differential amplifier which compares a signal furnished by a photosensitive element to a reference signal signifying the desired exposure.

16 Claims, 4 Drawing Figures

PATENTED JUN 18 1974 3,817,617

PHOTOGRAPHIC COPYING ARRANGEMENT WITH AUTOMATIC DIAPHRAGM CONTROL

BACKGROUND OF THE INVENTION

The present invention relates to a photographic coupling arrangement with an automatically regulated diaphragm. The automatic regulation takes place in correspondence to the density of the original being copied.

The known diaphragm control arrangements which regulate the intensity of light in automatic photographic copying arrangements are normally controlled by electromotors. When compared to rotary magnets, these electromotors have an unfavorable ratio of torque to mass, so that their response time is relatively large. Therefore, the diaphragm control switch work with electromotors require relatively long time until the desired diaphragm opening is attained in response to a change of light falling onto a photoelectric element.

SUMMARY OF THE INVENTION

It is an object of the present invention to furnish an automatic control system for the diaphragm which operates substantially without delay to keep the intensity of light falling upon a photosensitive sensing element within predetermined limits.

The present invention comprises a source of illumination furnishing light travelling along a predetermined path. It comprises diaphragm means positioned along said predetermined path, said diaphragm means having at least one movable element. First and second solenoid means are coupled in phase opposition to said movable element, for controlling the position thereof in response to activation signals. Means are provided for mounting said original in said predetermined path of said light. Further, photosensitive means are arranged following said original in the direction of light propagation along said predetermined path for furnishing a phototransducer output signal varying as a function of light impinging thereon. Finally, circuit means are connected to said photosensitive means, for furnishing said activation signals in dependence on said phototransducer output signal.

Because two solenoids are used which operate in phase opposition, a high turning moment is available for moving the element in which ever direction is desired. Further, the particular type of circuit which is provided assures that only that solenoid is activated which is to execute an acceleration in its operating direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
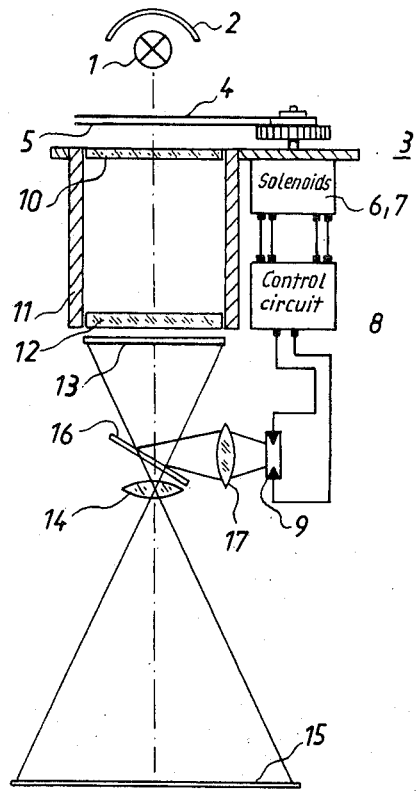
FIG. 1 is a schematic representation of the coupling arrangement of the present invention, having a diaphragm means for controlling the light intensity.

A preferred embodiment of the present invention will now be described with reference to the drawing.

A source of illumination has a reference numeral 1 in FIG. 1 and emits light in both an upward and a downward direction. The light emitted in the upward direction is reflected towards the downward direction by a reflector 2. The light travels downward along a predetermined path. Arranged along said predetermined path below said source of illumination is the diaphragm means 3. This will be described in greater detail in conjunction with FIGS. 2 and 3. Movable elements 4 and 5 constitute two diaphragm blades which are controlled by means of solenoids 6 and 7. Solenoids 6 and 7 are rotary magnets which are energized by means of a control circuit 8. The control circuit 8 furnishes activation signals to the solenoid in dependence upon a phototransducer output signal furnished by a photosensitive element 9 which is preferably a silicon-solar element. When a preferred embodiment of the control circuit is used, the diaphragm may also act as a shutter.

A diffusing lens 10 is arranged underneath the diaphragm blades 4 and 5. The diffusing lens 10 is arranged at the input of a light mixing arrangement which comprises a shaft 11 which has an internal mirrored surface. In order to achieve a softer copying light, a second diffusing lens 12 is arranged at the output side of the shaft 11. The original is mounted in close proximity to the second diffusing lens and has reference numeral 13. An objective 14 focusses the original onto light sensitive photographic copying material 15. A partially transmissive mirror 16 is arranged immediately in front of the objective 14, at an angle of 45°. The light reflected by the mirror is focussed onto photosensitive element 9 by means of a converging lens 17.

Figure 2:
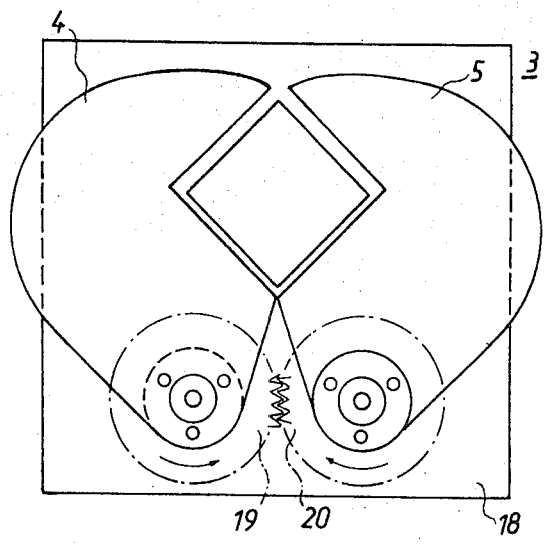
FIG. 2 is a horizontal projection of the diaphragm means of FIG. 1.
Figure 3:
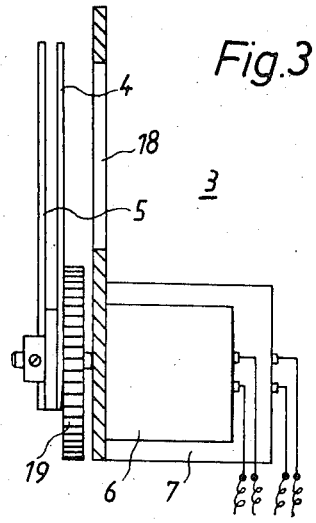
FIG. 3 is a side view of the diaphragm means in accordance with FIG. 2.

The diaphragm means are shown in greater detail in FIG. 2. A plate 18 is rigidly mounted within the housing of the copying arrangement and carries the housing for the rotary magnets 6 and 7. The axle ends of the rotary magnets 6 and 7 pass through corresponding bores to the upper side of the plate. The armature of rotary magnet 6 is coupled through gears 19 and 20 to rotary magnet 7. Gears 19 and 20 are arranged in such a way that the direction of rotation of rotary magnet 6 is always opposite to that of rotary magnet 7. The armature of each rotary magnet carries one of the blades 4 and 5, which together form a rectangular opening. The cross section of this opening corresponds to the cross section of the shaft 11. FIG. 3 shows the above-mentioned parts in a side view.

Figure 4:
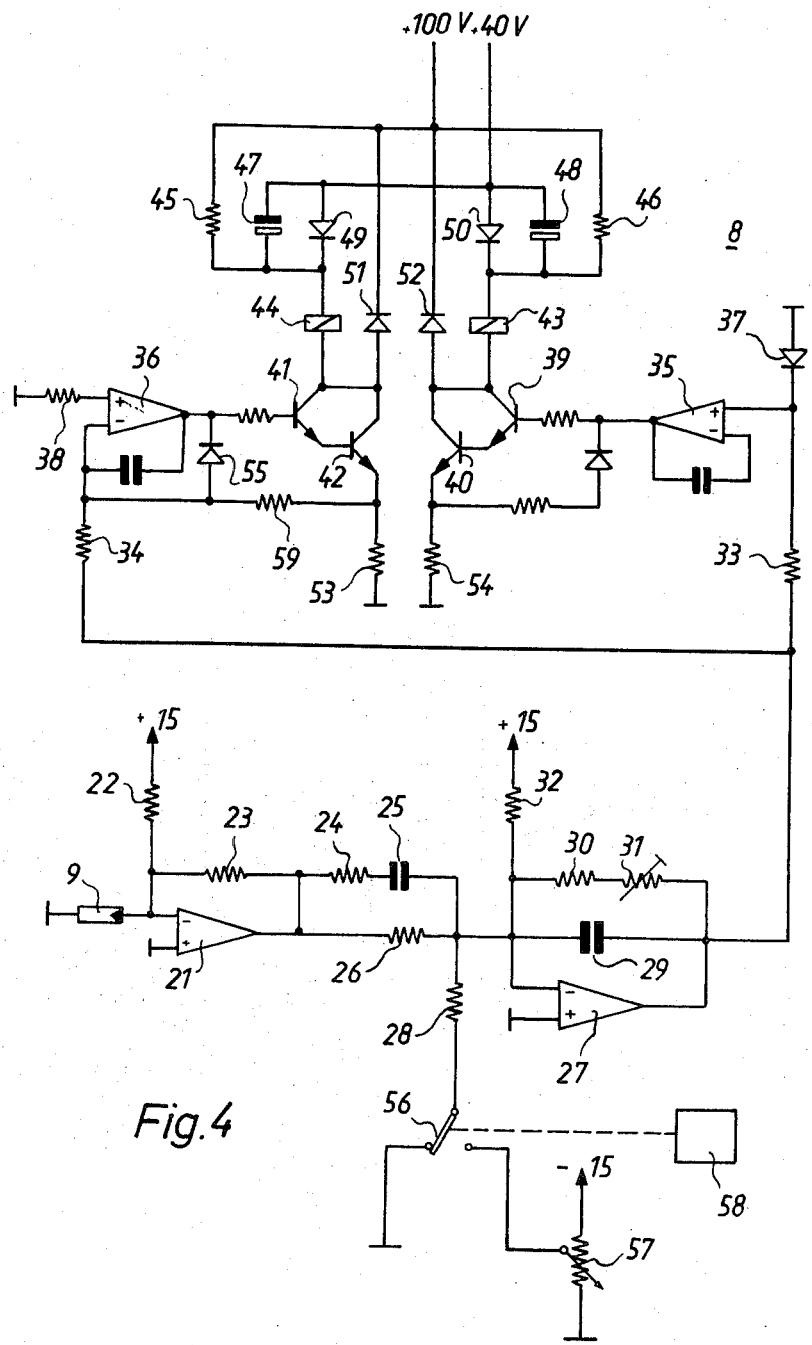
FIG. 4 is a circuit diagram for the control of the diaphragm means of FIGS. 2 and 3.

FIG. 4 shows the circuit diagram of the control circuit 8 for controlling the motion of magnets 6 and 7. Silicon solar element 9, which could also be replaced by a photoresistor, has one terminal connected to ground while its other terminal is connected to the inverting input of a current-voltage convertor, namely an analog amplifier 21. The non-inverting input or direct input of amplifier 21 is connected to ground. A resistor 23 is connected from output to the inverting input of amplifier 21. Further connected to the output of amplifier 21 is a lead network, namely a resistancecapacitance network having a resistor 24 connected in series with a capacitor 25. In conjunction with a resistor 26 which is connected in parallel with the series combination of resistor 24 and capacitor 25, this lead network serves to compensate for the mass inertia of the moving element in the system, namely for the mass inertia of the rotary magnets and the shutter blades connected thereto. The output of the lead network is connected to the inverting input of a differential amplifier 27 whose direct input is connected to ground. Further, a reference voltage is applied to the inverting input of amplifier 27 through a resistor 28. A double throw switch has a movable arm 56 which connects the free terminal of resistor 28 to ground potential when in one position and to a negative reference voltage derived from a potentiometer 57 when in a second position. The voltage furnished at the inverting input of amplifier 27, when switch arm 56 is in said second position is the second reference voltage, which is adjustable so as to allow variation of the desired exposure light intensity. When arm 56 is in the first position, that is when the inverting input of amplifier 27 is connected to ground, the circuit operates to effect a complete closure of the diaphragm. Switch 56 may be controlled by a timer which switches it into the first position while the original and the copying material, that is the printing paper are being transported and which switches it to the second position for a predetermined time period at the beginning of the reproducing or copying process. With this circuit arrangement, it is obvious that the diaphragm also works as a shutter.

A capacitor 29 is connected from the output to the inverting input of amplifier 27. A resistor 30 connected in series with a variable resistor 31 is connected in parallel with capacitor 29. Further connected to the inverting input of amplifier 27 is a resistor 32 whose other terminal is connected to a 15 volt voltage source. The direct input of amplifier 27 is connected to ground potential. Under these conditions the output signal of amplifier 27 is a difference signal which corresponds to the difference between the signal furnished by photosensitive element 9 and the reference signal. The output of amplifier 27 is connected through a resistor 33 to the direct input of an amplifier 35, herein referred to as first additional differential amplifier means. It is further connected through a resistor 34 to the inverting input of an amplifier 36, herein referred to as second additional differential amplifier means. Thus the output signal of amplifier 35 is of opposite phase to that of amplifier 36. First diode means 37 have an anode connected to ground and a cathode connected to the direct input of amplifier 35. A capacitor is connected from the output of amplifier 35 to the inverting input thereof. Further, a resistor 38 is connected between the direct input of amplifier 36 and ground potential. The output signals of amplifiers 35 and 35 constitute the activation signals for rotary magnets 43 and 44 respectively. Diode 37 serves to shunt negative signals appearing at the direct input of amplifier 35 to ground potential, thereby limiting signals at said direct input to positive signals. A diode 55 which connects the inverting input directly to the output of amplifier 36 serves substantially the same purpose, that is it shunts positive signals directly to the output of amplifier 36, thereby preventing positive difference signals from being amplified by amplifier 36. Thus amplifier 36 will furnish an output signal sufficient to activate rotary magnet 44 only for negative signals applied to its inverting input. Further, a capacitor is also connected from the output to the inverting input of amplifier 36. These capacitors act similarly as capacitor 29 in amplifier 27 and serve to cut the high frequency response of the amplifier. The output signals of amplifiers 35 and 36 are applied to two transistors connected in cascade, namely transistors 39, 40 and 41, 42 respectively. These transistors form the output stage for amplifiers 35 and 36 respectively and furnish currents to the rotary magnets whose magnitude depends upon resistors 53, 54 and the voltage applied to the bases of transistors 39 and 41.

Magnets 43 and 44 respectively are connected a 100 volt voltage source via resistors 46 and 45 respectively. Coil 43 is also connected to a plus 40 voltage source through a diode 50 connected in parallel with a capacitor 48, while coil 44 is connected to the plus 40 voltage source through a diode 49 connected in parallel with a capacitor 47. A diode 51 connects the other terminals of coil 43 to the 100 volt line, while a diode 51 connects the other terminal of coil 44 to the 100 volt line.

The above-described arrangement operates as follows:

Under quiescent conditions ground potential is applied to the inverting input of amplifier 27 which, as mentioned above, causes the diaphragm to close. During the time that the diaphragm is closed the original 13 and the copying material are positioned in the path of the light. The photosensitive element 9 is shielded against the light coming from light source 1. When the original and copying material have been properly positioned, timer 58 causes the movable arm 56 to move to its second position. The circuit now senses that the light falling on the photosensitive element 9 is of too low an intensity, that is the output signal of amplifier 21 is low compared to the reference voltage applied through resistor 28. The differential amplifier 27 therefore generates an output signal which causes the coils to open the diaphragm. Specifically, rotary magnet 43 is activated through amplifier 35 and transistors 39, 40. Rotary magnet 44, which acts to close the diaphragm blades has no current flowing therethrough. Thus the shutter blades 4 and 5 are opened with very high acceleration until the intensity of illumination at photosensitive means 9 approaches the desired illumination. To provide this acceleration, capacitor 48 has previously been charged to 100 volts via resistor 46 which serves as a charging circuit. When transistor 40 switches from a non-conducting to a conducting state in response to the output signal of amplifier 35, approximately 100 volts are directly applied to rotary magnet 43, causing a corresponding rapid rate of change of current. Further, the total voltage applied to rotary magnet 43 and transistor 40 connected in series therewith cannot drop to less than 40 volts because of the connection to the 40 volt source through diode 50. Current flow-through the coil 43 decreases with decreases in the difference signal. Thus the acceleration of movement of the diaphragm blades also decreases, while the velocity is maintained substantially at the same value. The lead effect of lead networks 24, 25 causes transistors 39 and 40 to become non-conductive prior to the time that the illumination upon photosensitive element 9 has reached the desired value. The current decrease through coil 43 is accelerated by diode 52 which connects one terminal of the coil to the 100 voltage source. Almost simultaneously, the change in polarity of the difference signal causes the coil of rotary magnet 44 to become energized in the same manner as was discussed with reference to the energization of coil 43 which cause the opening of the blades. Thus a high deceleration of the diaphragm blades occurs which causes the movement of the diaphragm blades to be stopped within a short period at the opening which causes the desired amount of illumination to impinge upon photosensitive element 9. Since the ratio of turning moment to mass is very advantageous in a system of this type, any oscillations around the desired diaphragm opening are highly damped so that the final value is reached very rapidly.

It will be noted that the above-described system causes the light intensity falling on the reproducing material to be the same regardless of the density of the original. Thus for a constant exposure, that is for $i \cdot t =$ constant, the exposure time must also be kept constant. This is accomplished by timer 58 which causes variable arm 56 to be in the second position, namely the position furnishing the reference signal indicative of the desired exposure, for a constant time. This particular embodiment of the present invention has the advantage that the influence of the Schwarzschild effect has been eliminated. Thus, after reproduction of any particular original, switch 56 is switched back to its first position closing the blades. When a second original, which for example may be much less dense than the first original is placed in the path of the light, the switch 56 is again switched to the second position. The diaphragm opening will now be much smaller, corresponding to the increase in density of light falling on photoelement 9. The illumination time being constant, the same exposure results for the second original as resulted for the first original.

Of course it is possible to use the present invention in an arrangement having a separate shutter. In this case it is not necessary that a switch 56 be provided to connect the terminal of resistor 28 to ground potential. Thus a conventional shutter also controlled by timer 58 may be used in conjunction with the present invention, the connection to ground through switch 56 having been eliminated.

If such a shutter is positioned between the light source and the diaphragm blades, movement of the diaphragm blades 4,5 only begins at the beginning of the exposure time. Under these circumstances, it is desirable that the closing solenoid be considerably stronger than the opening solenoid since the percentage error in exposure resulting from delay in the closing process for excessively light originals is considerably higher as the error resulting from the slow opening for very dense originals.

In cases where very short exposure times are required, as for example when a flash source of illumination is used, no possibility exists to adjust the diaphragm opening to the desired value at the beginning of the exposure time. Under these conditions a measuring station must be arranged in front of the copying station. At this measuring station, a constant light source must be provided. Light from the constant light source which has passed through the original to be copied is impinged upon the photosensitive element 9. The resultant output signal of amplifier 36, which is also arranged at the measuring station, is then stored until the original and the copying material have reached the copying station. At that time the so-stored value is furnished to the input of the differential amplifier 27 as in the embodiment shown in FIG. 4. The same type of storage arrangement is also desirable when color originals are to be reproduced. In this particular case, the stored value corresponds to the overall density of the original and the diaphragm opening does not depend upon the changes in illumination which would fall on the photosensitive element when the particular color filters are inserted into the path of the light. If such a storage arrangement were not used, the lower light intensities which would fall upon element 9 after insertion of such color filters would cause excessive illumination to be applied in the copying process. The stored value in such cases is the illumination intensity at the beginning of the copying process prior to the insertion of the color filters.

The storage arrangements mentioned above are well-known circuits in the analog computer art. For example, operational amplifiers having a feedback capacitor may be used. At the end of the copying process the capacitor is discharged, thereby rendering the circuit ready to receive the subsequent value.

While the invention has been illustrated and described as embodied in a specific type of control circuit, it is not intended to be limited to the details shown, since various structural and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Photographic arrangement for furnishing copies of an original, comprising, in combination, a source of illumination furnishing light travelling along a predetermined path; diaphragm means positioned along said predetermined path and having at least one movable element for controlling the passage of light therethrough; first and second solenoid means operable in phase opposition and coupled to said movable element for controlling the position thereof in response to activation signals; means mounting said original in said predetermined path; photosensitive means arranged following said original in the direction of light propagation along said predetermined path, for furnishing a phototransducer output signal varying as a function of light impinging thereon; and circuit means connected to said photosensitive means and said first and second solenoid means for furnishing said activation signals only to said first solenoid means in response to phototransducer output signals indicative of a required increase of light through said diaphragm means and only to said second solenoid means in response to phototransducer output signal indicative of a required decrease of light through said diaphragm means.

2. Photographic arrangement as set forth in claim 1, wherein said first and second solenoid means comprise first and second rotary magnet means, and gear means intercoupling said first and second rotary magnet means in such a manner that the direction of rotation of said first rotary magnet means is opposite to the direction of rotation of said second rotary magnet means.

3. Photographic arrangement as set forth in claim 2, wherein said diaphragm means has a first and second movable element, respectively coupled to said first and second rotary magnet means.

4. Photographic arrangement as set forth in claim 3, wherein said circuit means comprise reference signal furnishing means; differential amplifier means connected to said reference signal furnishing means and said photosensitive means for furnishing a difference signal corresponding to the difference between said reference signal and said phototransducer output signal; and additional circuit means connected to the output of said differential amplifier means, for furnishing said activation signals in response to said difference signal.

5. Photographic arrangement as set forth in claim 4, wherein said photosensitive means comprise a photosensitive element furnishing a photocurrent corresponding to the light impinging thereon; and current-voltage converter means connected to said photosensitive element for converting said photocurrent into a corresponding output voltage, said output voltage constituting said phototransducer output signal.

6. Photographic arrangement as set forth in claim 5, further comprising lead network means connected between the output of said current-voltage convertor means and the input of said differential amplifier means, for compensating for the mass moment of inertia of said rotary magnet means and said first and second movable elements.

7. Photographic arrangement as set forth in claim 4, wherein said reference signal furnishing means comprise first reference signal furnishing means furnishing a first reference signal adapted to effect complete closure of said diaphragm means, second reference signal furnishing means furnishing a second reference signal indicative of the desired exposure, and switching means alternately connecting said first and second reference signal furnishing means to the input of said differential amplifier means.

8. Photographic arrangement as set forth in claim 7, wherein said first reference signal furnishing means comprise means connecting said input of said differential amplifier to ground potential.

9. Photographic arrangement as set forth in claim 8, wherein said second reference signal furnishing means comprise adjustable second reference signal furnishing means.

10. Photographic arrangement as set forth in claim 4, further comprising first and second additional differential amplifier means each having an output connected to a corresponding one of said rotary magnet means, each having a direct input and an inverting input; further comprising means connecting the output of said differential amplifier means to the direct input of said first additional differential amplifier means and the inverting input of said second additional differential amplifier means.

11. Photographic arrangement as set forth in claim 10, wherein said difference signal has a first polarity indicative of required diaphragm opening and a second polarity indicative of required diaphragm closing; further comprising first diode means connected to said first additional differential amplifier means for suppressing all difference signals having said second polarity and second diode means connected to said second additional differential amplifier means for suppressing all difference signals having said first polarity.

12. Photographic arrangement as set forth in claim 11, further comprising a first voltage source for furnishing a first voltage; a second voltage source for furnishing a second voltage substantially exceeding said first voltage; first and second capacitor means respectively connected to said first and second rotary magnet means; first and second charging circuit means respectively connected between said second voltage source and said first and second capacitor means for charging said capacitor means to said second voltage prior to activation of the rotary magnet means connected thereto, thereby furnishing a source of starting energy; and third and fourth diode means respectively connected from siid first and second rotary magnet means to said second voltage source, each for effecting a rapid current decay in the corresponding one of said rotary magnet means.

13. Photographic arrangement as set forth in claim 1, wherein said diaphragm means are positioned prior to said original along said predetermined path; further comprising reflecting shaft means positioned between said diaphragm means and said original along said predetermined path.

14. Photographic arrangement as set forth in claim 1, further comprising means for deriving a test quantity of light for said photosensitive means mounted along said predetermined path following said original in the direction of propagation of light.

15. Photographic arrangement as set forth in claim 14, wherein said means for furnishing a test quantity of light comprise partially transmissive mirror means.

16. Photographic arrangement for furnishing copies of an original, comprising, in combination, a source of illumination furnishing light travelling along a predetermined path; diaphragm means positioned along said predetermined path and having at least one movable element for controlling the passage of light therethrough; first and second solenoid means operable in phase opposition and coupled to said movable element for controlling the position thereof in response to activation signals, said first and second solenoid means comprising first and second rotary magnet means, and gear means intercoupling said first and second rotary magnet means in such a manner that the direction of rotation of said first rotary magnet means is opposite to the direction of rotation of said second rotary magnet means; means for mounting said original in said predetermined path; photosensitive means arranged following said original in the direction of light propagation along said predetermined path, for furnishing a phototransducer output signal varying as a function of light impinging thereon; and circuit means connected to said photosensitive means and said first and second solenoid means for furnishing said activation signals in dependence on said phototransducer output signal.

* * * * *